United States Patent
Deng et al.

(10) Patent No.: US 10,880,489 B2
(45) Date of Patent: Dec. 29, 2020

(54) MONITORING METHOD FOR GOODS SHELF, MONITORING SYSTEM FOR GOODS SHELF AND GOODS SHELF

(71) Applicant: BOE TECHNOLOGY GROUP CO., LTD., Beijing (CN)

(72) Inventors: Wei Deng, Beijing (CN); Shijie Cao, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/410,415

(22) Filed: May 13, 2019

(65) Prior Publication Data

US 2020/0021742 A1 Jan. 16, 2020

(30) Foreign Application Priority Data

Jul. 10, 2018 (CN) .......................... 2018 1 0753178

(51) Int. Cl.
| | |
|---|---|
| *G06Q 40/00* | (2012.01) |
| *H04N 5/232* | (2006.01) |
| *G06T 7/11* | (2017.01) |
| *G06K 9/00* | (2006.01) |
| *G06Q 10/08* | (2012.01) |
| *G06T 7/00* | (2017.01) |
| *G05B 19/042* | (2006.01) |

(52) U.S. Cl.
CPC ..... *H04N 5/23299* (2018.08); *G06K 9/00771* (2013.01); *G06Q 10/087* (2013.01); *G06T 7/0002* (2013.01); *G06T 7/11* (2017.01); *G05B 19/0428* (2013.01); *G05B 2219/2651* (2013.01); *G06K 2209/21* (2013.01); *G06T 2207/30232* (2013.01)

(58) Field of Classification Search
CPC .. G06Q 10/087; G06Q 30/02; G06Q 10/0875; G06Q 30/0639; G06Q 50/28; G06Q 20/203; G06K 9/00771
USPC ............ 235/375, 383, 385; 382/103; 705/28
See application file for complete search history.

(56) References Cited

U.S. PATENT DOCUMENTS

| | | | |
|---|---|---|---|
| 2010/0171826 A1* | 7/2010 | Hamilton | ............... G06Q 30/06 348/135 |
| 2013/0332271 A1 | 12/2013 | Hay | |

FOREIGN PATENT DOCUMENTS

| | | |
|---|---|---|
| CN | 102592144 B | 3/2014 |
| CN | 104021388 A | 9/2014 |

(Continued)

OTHER PUBLICATIONS

Chinese Office Action dated Feb. 3, 2020.

*Primary Examiner* — Jamara A Franklin
(74) *Attorney, Agent, or Firm* — Dilworth & Barrese, LLP.; Michael J. Musella, Esq.

(57) ABSTRACT

A monitoring method for a goods shelf, a monitoring system for a goods shelf and a goods shelf are disclosed. The monitoring system for the goods shelf includes an image acquisition device and a controller. The image acquisition device includes a camera that is moveable along the goods shelf, and is configured to acquire an image of commodities on the goods shelf by the camera, and to send the image of the commodities to the controller; the controller is configured to recognize the image, which is acquired by the camera, of the commodities, so as to determine whether or not at least one of a group consisting of commodity shortage and commodity misplacement exists.

17 Claims, 5 Drawing Sheets

(56) References Cited

FOREIGN PATENT DOCUMENTS

| CN | 204089981 U | 1/2015 |
|---|---|---|
| CN | 106409191 A | 2/2017 |
| CN | 107221079 A | 9/2017 |

\* cited by examiner

MONITORING METHOD FOR GOODS SHELF, MONITORING SYSTEM FOR GOODS SHELF AND GOODS SHELF

CROSS REFERENCE TO RELATED APPLICATIONS

The application claims priority to Chinese patent application No. 201810753178.1, filed on Jul. 10, 2018, the entire disclosure of which is incorporated herein by reference as part of the present application.

TECHNICAL FIELD

Embodiments of the present disclosure relate to a monitoring method for a goods shelf, a monitoring system for a goods shelf and a goods shelf.

BACKGROUND

Nowadays, self-service supermarkets have become a new retail mode, and automatic monitoring (for example, real-time monitoring) of commodity shortage and commodity misplacement is necessary for the new retail mode.

SUMMARY

At least one of the embodiment provides a monitoring system for a goods shelf, which comprises: an image acquisition device and a controller. The image acquisition device comprises a camera that is moveable along the goods shelf, and is configured to acquire an image of commodities on the goods shelf by the camera, and to send the image of the commodities to the controller; the controller is configured to recognize the image, which is acquired by the camera, of the commodities, so as to determine whether or not at least one of a group consisting of commodity shortage and commodity misplacement exists.

For example, in at least one example of the monitoring system for the goods shelf, the monitoring system for the goods shelf further comprises a driver. The driver is configured to drive the camera to move along the goods shelf under control of the controller.

For example, in at least one example of the monitoring system for the goods shelf, the image acquisition device further comprises a sliding rail which is mounted on the goods shelf; the camera is mounted on the sliding rail and is slidable along the sliding rail; and the driver is mounted on an end of the sliding rail and is configured to drive the camera to slide along the sliding rail.

For example, in at least one example of the monitoring system for the goods shelf, the monitoring system for the goods shelf further comprises a communication device. The controller allows the communication device to send at least one of a group consisting of information related to the commodity shortage and information related to the commodity misplacement to a back-end server in a case where the controller determines that at least one of the group consisting of the commodity shortage and the commodity misplacement exists.

For example, in at least one example of the monitoring system for the goods shelf, the monitoring system for the goods shelf further comprises a target object detector. The target object detector is configured to detect whether or not a target object is in front of the goods shelf, and to send a detection result to the controller; and the controller is further configured to control a movement of the camera based on the detection result sent by the target object detector.

For example, in at least one example of the monitoring system for the goods shelf, the controller is further configured to allow the camera to conduct a reciprocating motion along the goods shelf in a case where the detection result is that the target object is not in front of the goods shelf; and the controller is further configured to allow the camera to follow a movement of the target object in a case where the detection result is that the target object is in front of the goods shelf.

For example, in at least one example of the monitoring system for the goods shelf, the controller is further configured to allow the camera to move along a sliding rail that is mounted on the goods shelf according to a pre-determined speed and acquire images of the commodities on the goods shelf according a pre-determined acquisition speed while conducting the reciprocating motion in a case where the detection result is that the target object is not in front of the goods shelf; and the controller is further configured to allow a distance between the camera and the target object is within a pre-determined distance range and to allow the camera to acquire the image of the commodities on the goods shelf while the distance between the camera and the target object is within the pre-determined distance range in a case where the detection result is that the target object is in front of the goods shelf.

For example, in at least one example of the monitoring system for the goods shelf, the controller is further configured to determine a main target object and to allow the camera to follow a movement of the main target object in a case where the detection result of the target object detector is that at least two target objects are in front of the goods shelf.

For example, in at least one example of the monitoring system for the goods shelf, the monitoring system for the goods shelf comprises a plurality of target object detectors; and the plurality of target object detectors are arranged in parallel along a length direction of the goods shelf.

For example, in at least one example of the monitoring system for the goods shelf, the goods shelf comprises a frame and at least one division plate that is fixed to the frame and is configured to allow the commodities to be placed thereon, and a side surface of each of the at least one division plate is provided with a baffle; the target object detector comprises at least one of a group consisting of an infrared sensor, an ultrasound sensor, a laser sensor, a weight sensor, or a gravity sensor; and at least one of a group consisting of the infrared sensor, the ultrasound sensor and the laser sensor is provided at a side, which is away from the each of the at least one division plate, of the baffle, or at least one of a group consisting of the gravity sensor and the weight sensor is provided at a region, which is in front of the goods shelf, of ground.

For example, in at least one example of the monitoring system for the goods shelf, the monitoring system for the goods shelf further comprises a power supply unit. At least part of the power supply unit is mounted on the goods shelf, and the power supply unit is configured to supply electricity to the monitoring system for the goods shelf; the goods shelf comprises a frame and at least one division plate that is fixed to the frame and is configured to allow the commodities to be placed thereon; and two ends of the sliding rail are respectively fixed to the frame; or the sliding rail is fixed at a bottom surface of the division plate.

For example, in at least one example of the monitoring system for the goods shelf, the controller is further configured to conduct following operations so as to recognize the images, which are sent by the camera, of the commodities comprises: dividing the images of the commodities into a plurality of image regions, wherein the plurality of image regions are respectively corresponding to a plurality of commodity regions of the goods shelf; determining whether or not each of the image regions comprises an image sub-region corresponding to a misplaced commodity based on the image of the commodities, and determining that the commodity misplacement exists in a case where at least one image region comprises the image sub-region corresponding to the misplaced commodity; and obtaining a number of each of the commodities in each of the commodity regions based on the image of the commodities, so as to acquire stock of the each of the commodities, and determining commodity shortage exists in a case where stock of at least one commodity is smaller than a stock reminding threshold of the at least one commodity.

For example, in at least one example of the monitoring system for the goods shelf, the image acquisition device is configured to acquire at least two images of the commodities on the goods shelf through the camera, and to send the at least two images of the commodities to the controller; and the controller is further configured to recognize the at least two images of the commodities so as to determine whether or not at least one of the group consisting of the commodity shortage and the commodity misplacement exists.

At least one of the embodiment provides another monitoring system for a goods shelf, which comprises: an image acquisition device and an information receiving and transmitting device. The image acquisition device comprises a camera that is moveable along the goods shelf, and is configured to acquire an image of commodities on the goods shelf by the camera; and the information receiving and transmitting device is configured to send the image of the commodities to a server, and to receive a recognition result, that is obtained based on the image of the commodities and is used to determine whether or not at least one of a group consisting of commodity shortage and commodity misplacement exists, from the server.

At least one of the embodiment provides further another monitoring system for a goods shelf, which comprises: an information receiving and transmitting device and a processor device. The information receiving and transmitting device is configured to receive an image, which is provided by a camera that is moveable along the goods shelf, of commodities on the goods shelf; the processor device is configured to recognize the image, so as to obtain a recognition result; and the information receiving and transmitting device is configured to send the recognition result, that is obtained based on the image by the processor device and is used to determine whether or not at least one of a group consisting of commodity shortage and commodity misplacement exist, to a client.

At least one of the embodiment provides a goods shelf, which comprises the monitoring system for the goods shelf provided by any embodiments of the present disclosure.

At least one of the embodiment provides a monitoring method for a goods shelf implemented by the monitoring system for the goods shelf provided by any embodiments of the present disclosure, which comprises: obtaining the image, acquired by the camera which is moveable along the goods shelf, of the commodities on the goods shelf; and recognizing the image of the commodities sent by the camera, so as to determine whether or not at least one of the group consisting of the commodity shortage and the commodity misplacement exists.

For example, in at least one example of monitoring method for the goods shelf, obtaining of the image, acquired by the camera which is moveable along the goods shelf, of the commodities on the goods shelf comprises obtaining the image, acquired by the camera which is slide along a sliding rail mounted on the goods shelf, of the commodities on the goods; the monitoring method for the goods shelf further comprises: sending at least one of a group consisting of information related to the commodity shortage and information related to the commodity misplacement to a back-end server in a case where it is determined that at least one of the group consisting of the commodity shortage and the commodity misplacement exists for the goods shelf.

For example, in at least one example of monitoring method for the goods shelf, the monitoring method further comprises: obtaining position information of a target object in front of the goods shelf based on a target object detector; controlling a driver based on the position information, so as to allow the camera to slide along the sliding rail to a pre-determined position corresponding to the position information. Obtaining of the image, acquired by the camera which is slide along the sliding rail mounted on the goods shelf, of the commodities on the goods comprises: acquiring the image through allowing the camera, which is slide along the sliding rail mounted on the goods shelf, to take a picture of the commodities while camera is at the pre-determined position.

For example, in at least one example of monitoring method for the goods shelf, the image of the commodities on the goods shelf are obtained by taking pictures of the commodities according to a pre-determined time gap by the camera while the camera conducts a reciprocating motion, along the sliding rail that is mounted on the goods shelf, according to a pre-determined speed; obtaining of the image, acquired by the camera which is moveable along the goods shelf, of the commodities on the goods shelf comprises obtaining at least two images, acquired by the camera which is moveable along the goods shelf, of the commodities on the goods shelf.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventors of the present disclosure have noted that, the following method is mainly adopted to realize automatic monitoring of at least one of commodity shortage and commodity misplacement (i.e., commodity shortage and/or commodity misplacement) with respect to commodities on a goods shelf. The method includes: firstly, acquiring an image (or images) of the commodities by a camera with a fixed position; secondly, recognizing the image (or images), which is acquired by the camera, of the commodities through an image recognition technology, and obtaining a recognition result; finally, determining whether or not at least one of the commodity shortage and the commodity misplacement exists based on the above-mentioned recognition result.

The inventors of the present disclosure have further noted that, because the view angle of a camera is limited, a blind zone may be present when using the camera to perform image acquisition with respect to the commodities on the goods shelf, and therefore, the detection accuracy and/or precision regarding the commodity shortage and the commodity misplacement may be adversely affected.

At least one of the embodiment provides a monitoring system for a goods shelf, a monitoring method for a goods shelf, and a goods shelf. The monitoring system for the goods shelf comprises: an image acquisition device (for example, an image acquisition unit) and a controller (for example, a control unit). The image acquisition device comprises a camera that is moveable along the goods shelf, and is configured to acquire an image of commodities on the goods shelf by the camera, and to send the image of the commodities to the controller; the controller is configured to recognize the image, which is acquired by the camera, of the commodities, so as to determine whether or not at least one of a group consisting of commodity shortage and commodity misplacement exists.

The monitoring system for the goods shelf provided by at least an embodiment of the present disclosure can improve the view angle of the image acquisition device and decrease the blind zone of the image acquisition device, such that the monitoring effect of the monitoring system for the goods shelf can be improved.

Non-limitative descriptions are given to the monitoring system for the goods shelf provided by at least an embodiment of the present disclosure in the following with reference to a plurality of examples. As described in the following, in case of no conflict, different features in these specific examples may be combined so as to obtain new examples, and the new examples are also fall within the scope of present disclosure.

Figure 1A:
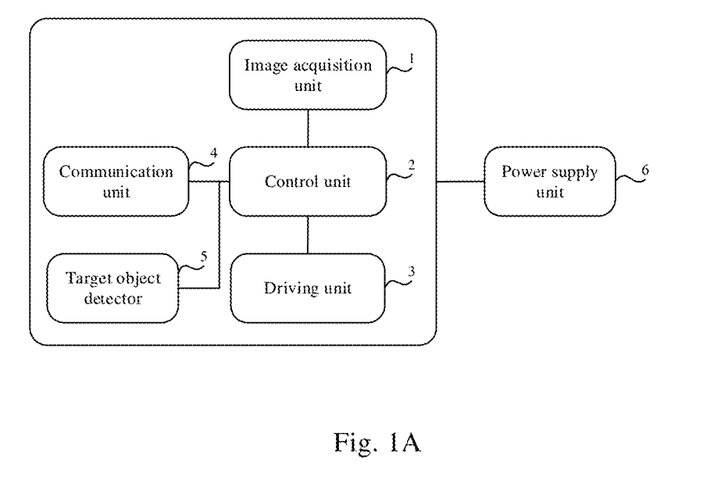
FIG. 1A is a schematic diagram of a monitoring system for a goods shelf provided by at least an embodiment of the present disclosure.
Figure 1B:
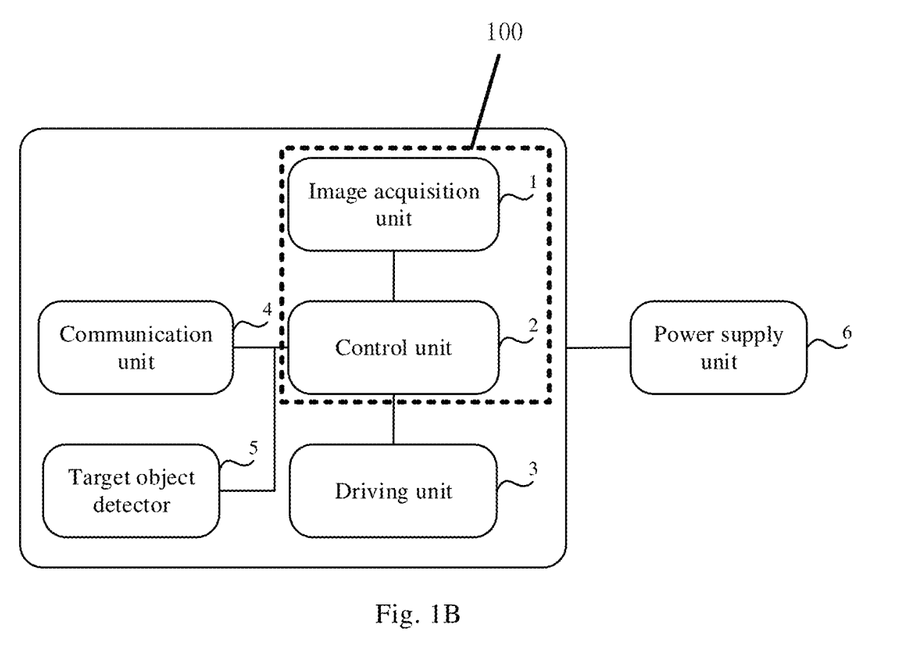
FIG. 1B is another schematic diagram of a monitoring system for a goods shelf provided by at least an embodiment of the present disclosure.
Figure 2A:
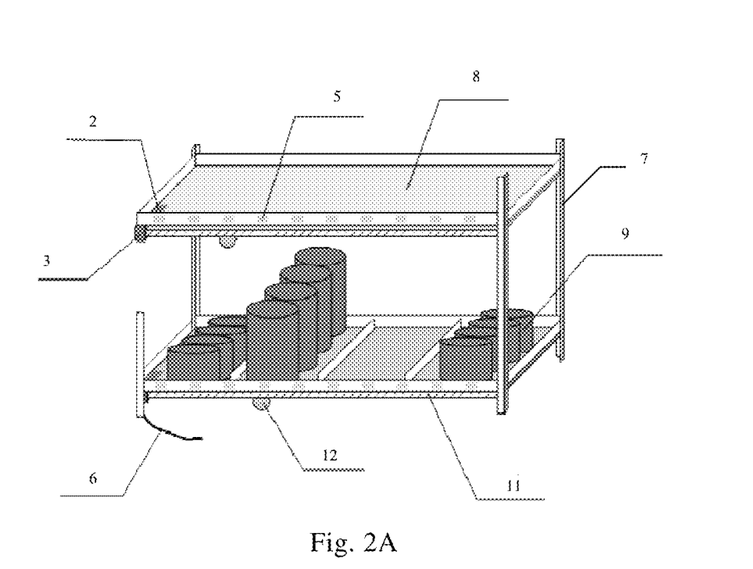
FIG. 2A is a schematically structural view of a goods shelf provided by at least an embodiment of the present disclosure.
Figure 2B:
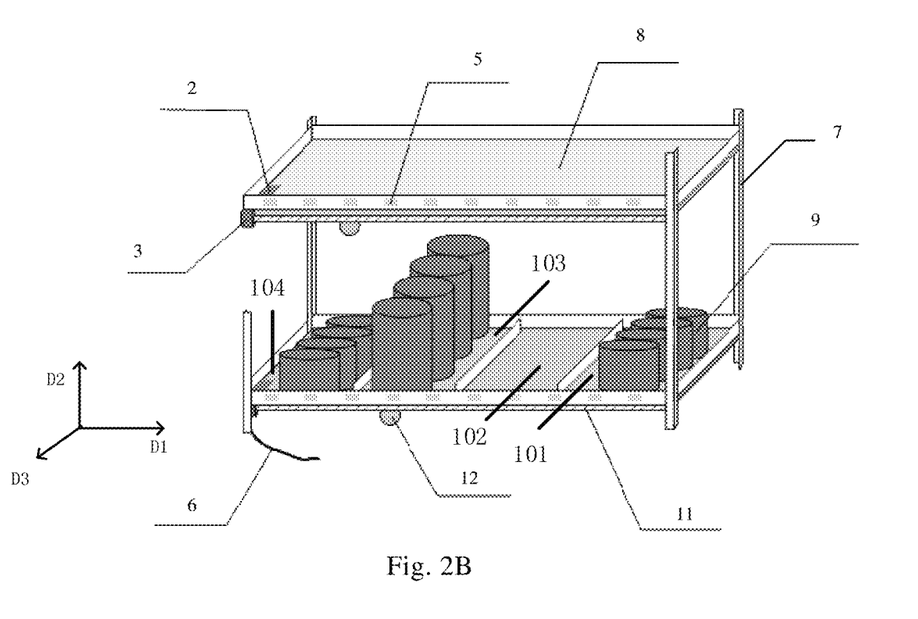
FIG. 2B is a schematically structural view of another goods shelf provided by at least an embodiment of the present disclosure.

Some embodiments of the present disclosure provide a monitoring system for a goods shelf. FIG. 1A is a schematic diagram of the monitoring system for the goods shelf provided by at least an embodiment of the present disclosure; FIG. 1B is another schematic diagram of the monitoring system for the goods shelf provided by at least an embodiment of the present disclosure. FIG. 2A is a schematically structural view of a goods shelf provided by at least an embodiment of the present disclosure; FIG. 2B is a schematically structural view of another goods shelf provided by at least an embodiment of the present disclosure. The monitoring system for the goods shelf as illustrated in FIG. 1A and FIG. 1B can be used in the goods shelves as illustrated in FIG. 2A and FIG. 2B, so as to automatically monitor the commodities placed on the goods shelf as illustrated in FIG. 2A and FIG. 2B.

For example, referring to FIG. 1A, FIG. 2A and FIG. 2B, the monitoring system for the goods shelf comprises: an image acquisition unit (for example, an image acquisition device) 1, a control unit (for example, a controller) 2, a driving unit (for example, a driver) 3, and a communication unit (for example, a communication device) 4. For example, the monitoring system 100 for the goods shelf as illustrated in FIG. 1B comprises the image acquisition unit (for example, the image acquisition device) 1 and the control unit (for example, the controller) 2, but does not comprise the driving unit (for example, the driver) 3 and the communication unit (for example, the communication device) 4, and in this case, the driving unit 3 and the communication unit 4 may be provided as the components of the goods shelf.

For example, as illustrated in FIG. 1A, FIG. 1B, FIG. 2A and FIG. 2B, the image acquisition unit 1 comprises a sliding rail that is mounted on the goods shelf 11 and a camera 12, and the camera 12 is mounted on the sliding rail 11 and is able to slide along the sliding rail 11. For example, the camera 12 may be a CCD type or a CMOS type camera, and the specific type of the camera is not limited in the present disclosure.

For example, as illustrated in FIG. 2A and FIG. 2B, the goods shelf comprises a frame 7, and a division plate (e.g., baffle plate) 8 that is fixed to the frame 7 and is configured to allow commodities 9 for selling to be placed on the division plate 8.

For example, as illustrated in FIG. 2A and FIG. 2B, the goods shelf comprises a plurality of commodity regions. For example, as illustrated in FIG. 2B, the goods shelf comprises a first commodity region 101, a second commodity region 102, a third commodity region 103 and a fourth commodity region 104. For example, the first commodity region 101, the second commodity region 102, the third commodity region 103 and the fourth commodity region 104 are respectively configured to place a first commodity, a second commodity (not illustrated in FIG. 2B), a third commodity and a fourth commodity.

For example, as illustrated in FIG. 2A and FIG. 2B, the goods shelf comprises a length direction, a height direction and a width direction, and the above-mentioned length direction, height direction and width direction are respectively the first direction D1, the second direction D2 and the third direction D3 as illustrated in FIG. 2B. For example, the first direction D1, the second direction D2 and the third direction D3 are perpendicular to each other.

For example, a consumer may move along the length direction of the goods shelf. For example, the sliding rail 11 may be mounted on the goods shelf, and the extension direction of the sliding rail 11 comprises a component along the length direction, and in this case, the movement path of the camera comprises a component along the length direction. No specific limitation will be given to the embodiments of the present disclosure regarding the specific position relations between the sliding rail and the goods shelf, as long as the arrangement of the sliding rail on the goods shelf allows the camera mounted on the sliding rail to be capable of taking pictures of the commodities on the division plate below the camera.

Figure 2C:
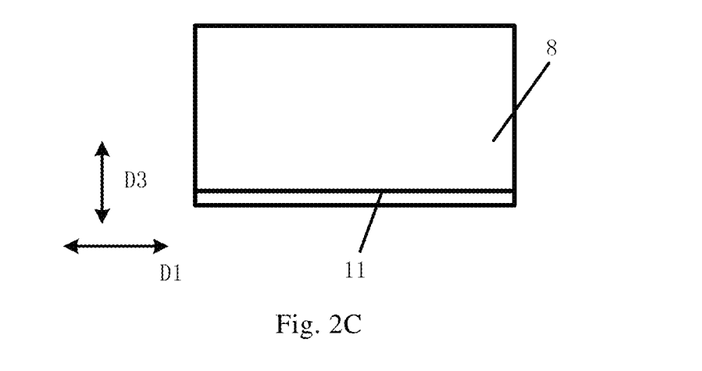
FIG. 2C is a schematic diagram illustrating a first arrangement of position relationship between a sliding rail and a bottom surface of a division plate, provided by at least an embodiment of the present disclosure.
Figure 2D:
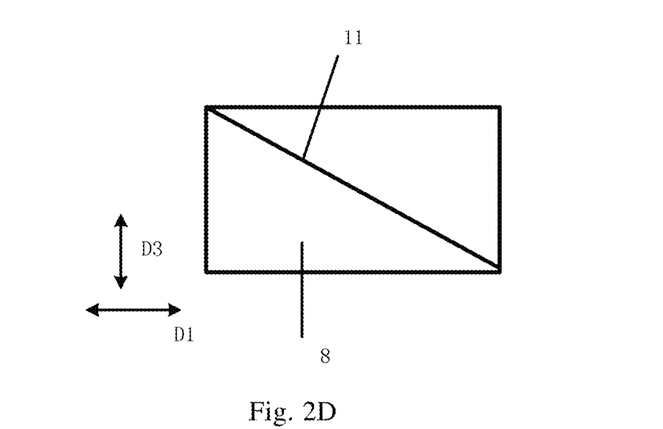
FIG. 2D is a schematic diagram illustrating a second arrangement of position relationship between a sliding rail and a bottom surface of a division plate, provided by at least an embodiment of the present disclosure.

For example, two ends of the sliding rail may be respectively fixed on the frame; for another example, the sliding rail may also be fixed at the bottom surface of the division plate 8. FIG. 2C is a schematic diagram illustrating a first arrangement of position relationship between the sliding rail 111 and the bottom surface of the division plate 8, and FIG. 2D is a schematic diagram illustrating a second arrangement of position relationship between the sliding rail 111 and the bottom surface of the division plate 8. As illustrated in FIG. 2C, the extension direction of the sliding rail 11 which is provided at the bottom surface of the division plate 8 is parallel to the length direction of the goods shelf (i.e., the first direction D1), such that the view angle of the image acquisition device can be increased and the blind zone of the image acquisition device can be decreased. As illustrated in FIG. 2D, the extension direction of the sliding rail 11 which is provided at the bottom surface of the division plate 8 may comprise a component parallel to the length direction (i.e., a component parallel to the first direction D1) and a component parallel to the width direction (i.e., a component parallel to the third direction D3), such that the view angle of the image acquisition device can be further increased and the blind zone of the image acquisition device can be further reduced.

In some examples, the image acquisition unit 1 may also not comprise the sliding rail 11, and in this case, the image acquisition unit 1 may comprise a conveyor belt or other suitable conveyor device, the camera may be provided on the conveyor belt or other suitable conveyor device, such that the camera can move along the goods shelf along with the operation of the conveyor belt or other suitable conveyor device. For example, the specific position relationship between the goods shelf and the conveyor belt or other suitable conveyor device may refer to the position relationship between the sliding rail 11 and the goods shelf, and no further description will be given here.

For example, the image acquisition unit 1 is configured to acquire the image of the commodities on the goods shelf, and to send the image of the commodities to the control unit 2. For example, the image acquisition unit 1 is configured to acquire at least two images of the commodities on the goods shelf through the camera, and to send at least two images of the commodities to the control unit 2. For example, the at least two images of the commodities on the goods shelf are acquired by the camera when the camera is located at at least two different positions of the goods shelf, respectively, and therefore, the above-mentioned at least two images have some difference therebetween, such that the effective view angle (for example, the view angle corresponding to the combined image of the at least two images) of the movable camera in the image acquisition unit 1 is increased compared with the view angle of the camera with a fixed location.

In the monitoring system for the goods shelf provided by at least an embodiment of the present disclosure, by mounting the sliding rail on the goods shelf, mounting the camera on the sliding rail, and allowing the camera to be able to slide along the sliding rail and to acquire the image of the commodities on the goods shelf at a desired position, the view angle (the effective view angle) of the camera can be increased, so as to suppress or eliminate the blind zone problem that may present when the camera with a fixed position performs the image acquisition with respect to the commodities, such that the accuracy and/or the precision of the detection result of the monitoring system for the goods shelf in commodity shortage and commodity misplacement.

For example, the driving unit 3 is mounted on one end of the sliding rail 11 and is configured to drive the camera 12 to slide on the sliding rail 11. For example, the driving unit 3 may comprise a lead screw (for example, a ball screw) and a motor, but the embodiments of the present disclosure are not limited to this case. For example, the motor connects the lead screw, the motor can run to allow the rotor of the motor to rotate, and the lead screw can convert the rotational motion of the rotor into a linear motion, such that the driving unit 3 can allow the camera 12 to slide on the sliding rail 11. For example, the driving unit 3 is not limited to be mounted on one end of the sliding rail 11, and the driving unit 3 may also be mounted on other suitable location, as long as the driver can drive the camera to move along the goods shelf under the control of the controller.

It should be understood that, in some examples, the monitoring system for the goods shelf may also not comprise the driving unit 3, and in this case, the user (for example, the owners of a shop) of the monitoring system for the goods shelf may configure the driving unit by himself or herself and allow the driving unit to be related to the sliding rail 11 and the control unit.

For example, the control unit 2 is configured to control the driving unit. For example, the control unit 2 is further configured to recognize the image of the commodities sent by the camera 12 (e.g., to recognize at least two images of the commodities sent by the camera 12), so as to determine whether or not at least one of commodity shortage and commodity misplacement exists based on the recognition result of the control unit 2. For example, recognizing of the image of the commodities may be performed by the control unit 2 based on suitable image recognition technologies, and no further description will be given here.

For example, the commodity shortage means that the number of a specific kind of commodity on the goods shelf is smaller than the stock reminding threshold of the specific kind of commodity. For example, the stock reminding threshold may be set based on the average replenishment time of the specific kind of commodity (i.e., average time from placing an order with a wholesaler until having the specific kind of commodity to be shipped to the goods shelf), average on-shelf time of the specific kind of commodity (i.e., the average value of the time between placing the commodity on the goods shelf and successfully selling out the commodity), and quality guarantee period of the specific kind of commodity. For example, in the case where the average replenishment time is relatively short, the average on-shelf time is relatively long, and the quality guarantee period is relatively short, the stock reminding threshold may be set to be a relatively small value (for example, 1 or 2). For example, in the case where the average replenishment time is relatively long, the average on-shelf time is relatively short, and the quality guarantee period is relatively long, the stock reminding threshold may be set to be a relatively large value (for example, 5). For example, because the number of the second commodity as illustrated in FIG. 2B is equal to zero, it may be determined that the commodity shortage exists (shortage of the second commodity exists).

For example, the commodity misplacement means that one of the commodity regions is placed with a commodity that does not belongs to this region of the commodity regions. For example, in the case where the fourth commodity or a commodity that does not belong to the first commodity is within the first commodity region 101, it can be determined that the commodity misplacement exists (the commodity misplacement exists in the first commodity region 101).

For example, recognizing of the image (for example, at least two images) of the commodities sent by the camera comprises the following step S101-step S103.

Step S101: dividing each of the image (for example, at least two images) of the commodities into a plurality of image regions, in which the plurality of image regions are respectively corresponding to a plurality of commodity regions of the goods shelf.

Step S102: determining whether or not each of the image regions comprises an image sub-region corresponding to a misplaced commodity based on the image (for example, at least two images) of the commodities and determining that the commodity misplacement exists in the case where at least one image region comprises the image sub-region corresponding to the misplaced commodity.

Step S103: obtaining the number of the commodities in each of the commodity regions based on the image (for example, at least two images) of the commodities, so as to acquire stock of each of the commodities, and determining commodity shortage exists in a case where stock of at least one commodity is smaller than a stock reminding threshold of the at least one commodity.

For example, after the control unit 2 recognizes the image (for example, at least two images) of the commodities sent by the camera, the control unit 2 may provide a recognition result. For example, the recognition result comprises at least one of the information regarding whether or not each of the image regions comprises an image sub-region corresponding to a misplaced commodity and the stock information of each of the commodities. For example, the recognition result may be used to determine whether or not at least one of commodity shortage and commodity misplacement exists. For example, the recognition result may be used to determine whether or not the commodity shortage and commodity misplacement exist. For example, the control unit 2 may be used to determine whether or not at least one of (at least one of the group consisting of) commodity shortage and commodity misplacement exists based on the recognition result.

For example, the control unit (the controller) 2 may include a processor and a memory. The processor, for example, is a central processing unit (CPU) or a processing unit in other forms having data processing capability and/or instruction execution capability. For example, the processor may be implemented as a general-purpose processor (GPP) and may also be a microcontroller, a microprocessor, a digital signal processor (DSP), a special-purpose image processing chip, a field programmable logic array (FPLA), and the like. The memory, for example, may include a volatile memory and/or a non-volatile memory, for example, may include a read-only memory (ROM), a hard disk, a flash memory, and the like. Correspondingly, the memory may be implemented as one or more computer program products. The computer program products may include computer readable storage media in various forms. One or more computer program instructions may be stored in the computer readable storage medium. The processor can run the program instructions to realize the function of the control device in the embodiment of the present disclosure as described below and/or other desired functions. The memory can also store various other application programs and various data (for example, at least two images of the commodities on the goods shelf acquired by the camera, the determination result of whether or not at least one of commodity shortage and commodity misplacement exists).

For example, the communication unit 4 is configured to receive at least one of the information related to the commodity shortage and the information related to the commodity misplacement and send at least one of the information related to the commodity shortage and the information related to the commodity misplacement to a server (for example, a back-end server) in the case where the control unit 2 determines that at least one of the commodity shortage and the commodity misplacement exist.

For example, the communication unit 4 may send at least one of the information related to the commodity shortage and the information related to the commodity misplacement to the server (for example, the back-end server) through a network technology or other technologies. For example, the network may be the Internet, wireless local area network (WLAN), mobile communication network, and the like; for example, the other technologies can include Bluetooth communication technology, infrared communication technology, etc. For example, the server may be a general purpose server or a special purpose server and may be a virtual server, a cloud server, etc. For example, the communication unit 4 may also perform operations such as coding and decoding of the sent information or the received information.

For example, the communication unit 4 may be the communication unit that is according to, for example, standards such as WIFI (Wireless Network, Wireless Fidelity) or Bluetooth and has a wireless network communication function.

It should be understood that, in some examples, the monitoring system for the goods shelf may also not comprise the communication unit 4, and in this case, the users of the monitoring system for the goods shelf may configure the communication unit on the goods shelf by himself or herself, and allow the communication unit to be related to the control unit and the server.

For example, the monitoring system for the goods shelf may also comprise a target object detector 5. The target object detector 5 is configured to detect whether or not a target object is in front of the goods shelf, and to send the detection result to the control unit 2, for example, in the case where the detection result is that the target object in front of the goods shelf. For example, the target object may be a consumer that may buy at least one of the commodities, may also be a user (e.g., operator), and may also be a robot for loading the commodities on the goods shelf.

For example, the control unit 2 is further configured to control the movement of the camera 12 according to the detection result sent by the target object detector 5. For example, the control unit 2 is also configured to control the driving unit 3 according to the detection result sent by the target object detector 5.

For example, in the case where the detection result is that the target object is not in front of the goods shelf, the controller is configured to allow the camera to conduct a reciprocating motion along the goods shelf (to conduct a reciprocating motion along the first direction D1). For example, the controller is configured to allow the camera to move from the left side in FIG. 2B to the right side in FIG. 2B, and then to move from the right side in FIG. 2B to the left side in FIG. 2B, and so on. For example, in the case where the detection result is that the target object is not in front of the goods shelf, the controller is configured to allow the camera acquire the image of the commodities on the goods shelf according to a pre-determined acquisition speed while conducting the reciprocating motion along the sliding rail that is mounted on the goods shelf according to a pre-determined speed (for example, a uniform speed). For example, the above-mentioned pre-determined speed and pre-determined acquisition speed may cooperate with each other and match with the length of the sliding rail and the size of the commodities. For example, in the case where the length of the sliding rail is about one meter and the size of the commodities is about ten centimeters, the above-mentioned pre-determined speed and the pre-determined acquisition speed may be configured to allow the camera to acquire 5-10 images of the commodities during the camera moves from one end of the sliding rail to another end of the sliding rail.

For example, in the case where the detection result is that the target object is in front of the goods shelf, the controller is configured to allow the camera to follow the movement of the target object. For example, in the case where the detection result is that the target object is in front of the goods shelf, the controller is configured to allow the distance between the camera and the target object (the distance between the camera and the target object in the first direction D1) to be within a pre-determined distance range, and the camera is configured to acquire the image of the commodities on the goods shelf when the distance between the camera and the target object is within the pre-determined distance range. For example, the pre-determined distance range may be set according to practical experience. For example, the pre-determined distance range may be ranged from 20 centimeters to 30 centimeters.

In some examples, the position information of the target object may be detected (for example, detected in real time) through the target object detector, and thus the camera may follow (for example, follow in real time) the movement of the target object. Because the target object may take a commodity in the region, which faces the target object, of the goods shelf, the probability for the commodities in the region, which faces the target object, of the goods shelf to suffer from the commodity shortage or the commodity misplacement is highest, and therefore, the monitoring system for the goods shelf provided by these examples can increase the efficiency in detecting the commodity shortage and the commodity misplacement.

For example, in the case where the target object detector detects at least two target objects are in front of the goods shelf, the controller is configured to determine a main target object (primary target object) of the at least two target objects, and to allow the camera to follow the movement of the main target object. For example, the method for the controller to determine the main target object of the at least two target objects may be set according to specific implementation demands. For example, in the case where the target object detector detects at least two target objects are in front of the goods shelf, a camera for face recognition may be turned on to acquire the image of the plurality of target object, the purchasing history of the plurality of target objects may be obtained based on the image of the plurality of target object, and then the main target object may be determined based on the purchasing history of the plurality of target objects. For example, the main target object may be the target object that buys the most commodities on the goods shelf among the plurality of target objects. For example, by allowing the camera to follow the movement of the main target object, the efficiency, in detecting the commodity shortage and the commodity misplacement, of the monitoring system for the goods shelf can be further increased.

For example, as illustrated in FIG. 2B, the monitoring system for the goods shelf may comprise a plurality of target object detectors; and the target object detectors are arranged in parallel along the movement direction of the camera or along the length direction of the goods shelf (for example, the first direction D1). For example, because the target object is moved along the length direction of the goods shelf, the position information of the target object can be obtained in time through allowing the plurality of target object detectors to be arranged along the length direction of the goods shelf, so as to allow the camera to be able to follow the target object in real time, such that the efficiency, in detecting the commodity shortage and the commodity misplacement, of the monitoring system for the goods shelf can be increased. For example, the plurality of target object detectors may be arranged with a uniform spacing along the length direction of the goods shelf, that is, the distances between any two adjacent target object detectors along the first direction D1 are the same.

For example, the target object detector 5 may comprise any one or any combination of an infrared sensor, an ultrasound sensor, a laser sensor, a weight sensor or a gravity sensor.

For example, the goods shelf generally comprise a frame and at least one division plate, which is configured to allow the commodities to be placed thereon, fixed to the frame, and a side surface (the side surface is closer to the passage for the target object to move) of each division plate is provided with a baffle. For example, the infrared sensor, the ultrasound sensor or the laser sensor is provided at the side, which is away from the each division plate, of the baffle; the weight sensor or the gravity sensor is provided at the region of ground in front of the goods shelf, and the gravity sensor is configured to detect the target object through gravity sensing, and the weight sensor is for example, configured to detect the target object through sensing the weight of an object on the weight sensor.

For example, the monitoring system for the goods shelf may further comprise a power supply unit 6 (a power supply), and at least part of the power supply unit 6 is mounted on the goods shelf, and the power supply unit 6 is configured to supply electricity to the monitoring system for the goods shelf. For example, the power supply unit 6 comprises a power supply line and a power providing module (not illustrated in figures), one end of the power supply line electrically connects the power providing module (for example, a battery), and another end of the power supply line electrically connects the monitoring system for the goods shelf, such that the power providing module can supply electricity to the monitoring system for the goods shelf through the power supply line. For example, in some examples, the monitoring system for the goods shelf may only comprises part (for example, the power supply line) of the power supply unit 6, while other part (for example, the power providing module) of the power supply unit 6 can be configured by the user of the monitoring system for the goods shelf.

In some embodiments of the present disclosure, the power supply unit 6 is provided to supply electricity to the monitoring system for the goods shelf. The power supply unit 6 may be a battery device, the power supply line with an external plug, or the combination structure of the battery device and the power supply line with the external plug.

For example, at least one of signal and instruction may be transferred between the control unit and any one of the image acquisition unit, the driving unit, the target object and the communication unit through a wireless or wired way. For example, wireless signal transmission may be realized through a network technology or other technologies. The network technology or other technologies may refer to the above-mentioned descriptions, and no further description will be given here.

Figure 5:
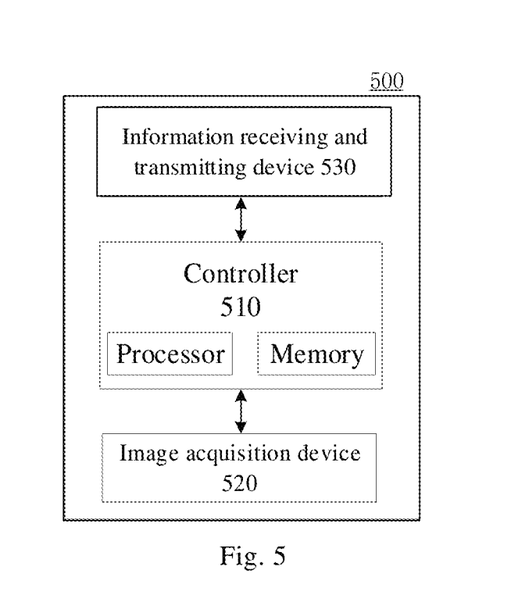
FIG. 5 is a schematic diagram of another monitoring system for a goods shelf provided by at least an embodiment of the present disclosure.

At least one embodiment of the present disclosure provides another monitoring system for the goods shelf, as illustrated in FIG. 5, and the above-mentioned another monitoring system 500 for the goods shelf comprises: an image acquisition device 520, an information receiving and transmitting device (e.g. transceiver) 530 and a controller 510. The controller 510 comprises a processor and a memory, and the specific implementation of the processor and the memory may refer to the above-mentioned descriptions, and no further description will be given here. The image acquisition device comprises a camera that is moveable along the goods shelf, and is configured to acquire an image (at least two images) of commodities on the goods shelf by the camera; the information receiving and transmitting device 530 is configured to send the image (at least two images) of the commodities to a server, and to receive a recognition result, that is obtained based on the image (at least two images) of the commodities and is used to determine whether or not at least one of the group consisting of commodity shortage and commodity misplacement exists, from the server; the controller is configured to determine whether or not at least one of the group consisting of (at least one of) commodity shortage and commodity misplacement exists based on the recognition result.

For example, the information receiving and transmitting device 530 may send the image (at least two images), which is acquired by the camera, of the commodities on the goods shelf to the server through a network technology or other technologies, and receive the recognition result, that is obtained based on the image (at least two images) of the commodities and is used to determine whether or not at least one of the group consisting of the commodity shortage and the commodity misplacement exists, from the server through the network technology or other technologies. For example, the information receiving and transmitting device 530 may comprise a modem, a network adapter, a Bluetooth transmitter and receiver, or an infrared transmitter and receiver, etc. For example, the information receiving and transmitting device 530 may further perform operations such as coding and decoding of the sent information or the received information. The above-mentioned network technology or other technologies may refer to the above-mentioned descriptions, and no further description will be given here.

For example, by providing the information receiving and transmitting device 530, and transmitting the image (at least two images), which are acquired by the camera, of the commodities on the goods shelf to the server, the requirement of the monitoring system 500 for the goods shelf on the computation capability and power consumption of the controller 510 can be reduced.

For example, as illustrated in FIG. 5, the monitoring system 500 for the goods shelf is similar as the monitoring system 500 for the goods shelf as illustrated in FIG. 1A and FIG. 2A, for example, as illustrated in FIG. 5, the monitoring system 500 for the goods shelf may also comprise a target object detector, and no further description will be given for the repeated content. For example, in the case where the server that is configured to obtain the recognition result and the back-end server that is configured to obtain at least one of (at least one of the group consisting of) the information related to the commodity shortage and the information related to the commodity misplacement are implemented with same one server, part of the functions of the monitoring system 500 for the goods shelf (determination of whether or not at least one of commodity shortage and commodity misplacement exists based on the recognition result) may be realized by the server, and in this case, providing of the controller 510 in the monitoring system 500 for the goods shelf may become unnecessary, providing of the recognition result of the monitoring system 500 for the goods shelf to the server may be unnecessary, and providing of the determination result, which is obtained by the controller based on the recognition result and regarding whether or not at least one of commodity shortage and commodity misplacement exists, to the monitoring system 500 for the goods shelf may be unnecessary as well, such that the communication traffic between the monitoring system 500 for the goods shelf and the server can be reduced.

Figure 6:
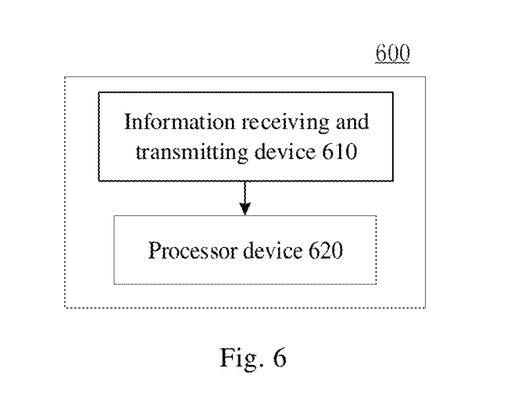
FIG. 6 is a schematic diagram of further another monitoring system for a goods shelf provided by at least an embodiment of the present disclosure.

At least one embodiment of the present disclosure provides further another monitoring system for the goods shelf, as illustrated in FIG. 6, and the further another monitoring system 600 for the goods shelf comprises an information receiving and transmitting device 610 and a processor device 620. For example, the functions of the processor device 620 for the goods shelf may be realized by a server, and the server may be a general purpose server or a special purpose server and may be a virtual server, a cloud server, etc. For example, the information receiving and transmitting device 610 may comprise a modem, a network adapter, a Bluetooth transmitter and receiver, or an infrared transmitter and receiver, etc. For example, the information receiving and transmitting device 610 may also perform operations such as coding and decoding of the sent information or the received information.

For example, the information receiving and transmitting device 610 may receive the image (at least two images) of the commodities on the goods shelf from a client through a network technology or other technologies. For example, the processor device 620 is configured to recognize the image (at least two images), so as to obtain the recognition result. For example, the information receiving and transmitting device 610 may sent the recognition result to the client through a network technology or other technologies, and the recognition result is obtained by the processor device 620 based on the image (at least two images) and is used to determine whether or not at least one of commodity shortage and commodity misplacement exists.

For example, the monitoring system 500 for the goods shelf, which is illustrated in FIG. 5 and serves as a client, and the monitoring system 600 for the goods shelf, which is illustrated in FIG. 6 and serves as a server, may cooperate with each other and form a new monitoring system for the goods shelf, and the client and the server may be provided at same one location or at different locations.

Some embodiments of the present disclosure further provide a goods shelf, and the goods shelf comprises the above-mentioned monitoring system for the goods shelf. FIG. 2A is a schematic diagram of a goods shelf provided by at least an embodiment of the present disclosure. FIG. 2B is a schematic diagram of another goods shelf provided by at least an embodiment of the present disclosure. As illustrated in FIG. 2A and FIG. 2B, the goods shelf comprises: a frame 7, a division plate 8, a sliding rail 11, a camera 12, a motor 3, a target object detector 5, a power supply line 6 and a control unit 2. The division plate 8 is fixed to the frame 7 and is configured to allow the commodities to be placed thereon (the commodities 9 to be sold may be placed on the division plate 8); the sliding rail is mounted on the goods shelf 11; the camera 12 is mounted on the sliding rail 11 and is able to slide on the sliding rail 11; the motor 3 (for example, part of the driving unit) is mounted on an end of the sliding rail 11, and the motor 3 provides power for the camera 12 to slide on the sliding rail 11; the target object detector 5 is provide on the baffle that is at the side surface of the division plate 8, and is configured to detect the position of a target object in the case where the target object is in front of the goods shelf; the power supply line 6 (for example, part of the power supply unit) is configured to supply electricity to the monitoring system for the goods shelf. On one hand, the control unit 2 obtains the position information of the target object from the target object detector 5, and controls the operation of the motor 3 according to the position information, so as to control the position of the camera 12 at the sliding rail 11, such that the camera 12 can acquire, within a shorter time period, the image of the commodities showing at least one of the problem regarding the commodity shortage and the problem regarding the commodity misplacement; on another hand, the control unit 2 may obtain the image of the commodities from the camera 12, and perform image recognition with respect to the image of the commodities to determine whether or not at least one of the group consisting of the commodity shortage and the commodity misplacement exists, and send at least one of the group consisting of information related to the commodity shortage and information related to the commodity misplacement to a back-end server.

Some embodiments of the present disclosure further provide a monitoring method for a goods shelf, and the monitoring method for the goods shelf is realized based on the monitoring system for the goods shelf provided by any embodiment of the present disclosure, and the monitoring method for the goods shelf comprises: obtaining the image (for example, at least two images), acquired by the camera which is moveable along the goods shelf, of the commodities on the goods shelf; and recognizing the image (for example, at least two images) of the commodities sent by the camera, so as to determine whether or not at least one of the group consisting of the commodity shortage and the commodity misplacement exists.

For example, obtaining of the image (for example, at least two images), acquired by the camera which is moveable along the goods shelf, of the commodities on the goods shelf comprises obtaining the image (for example, at least two images), acquired by the camera which is slide along a sliding rail mounted on the goods shelf, of the commodities on the goods.

For example, the monitoring method for the goods shelf further comprises: sending at least one of the information related to the commodity shortage and the information related to the commodity misplacement to a back-end server in the case where it is determined that at least one of the commodity shortage and the commodity misplacement exists for the goods shelf.

Illustrative descriptions will be given to the monitoring method for the goods shelf provided by at least an embodiment of the present disclosure with reference to FIG. 3 and FIG. 4.

Figure 3:
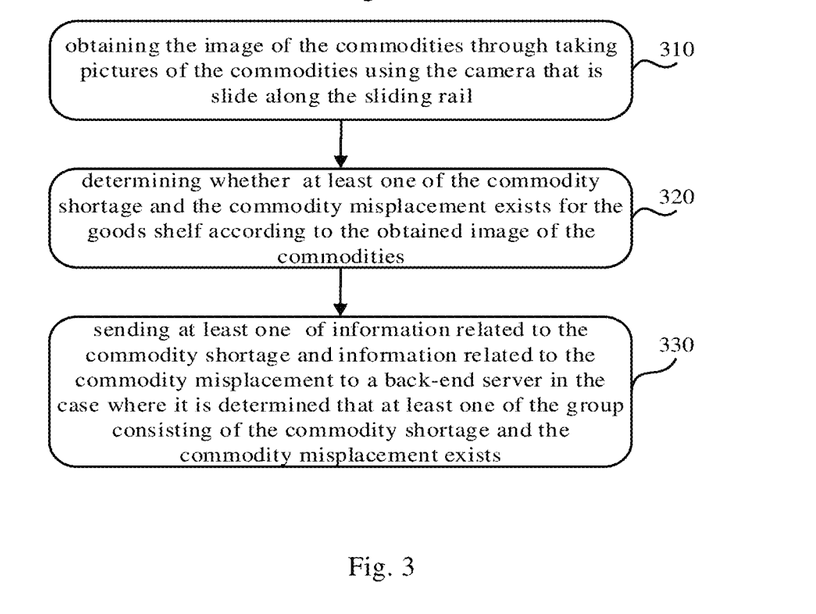
FIG. 3 is a flow chart of a monitoring method for a goods shelf provided by at least an embodiment of the present disclosure.
Figure 4:
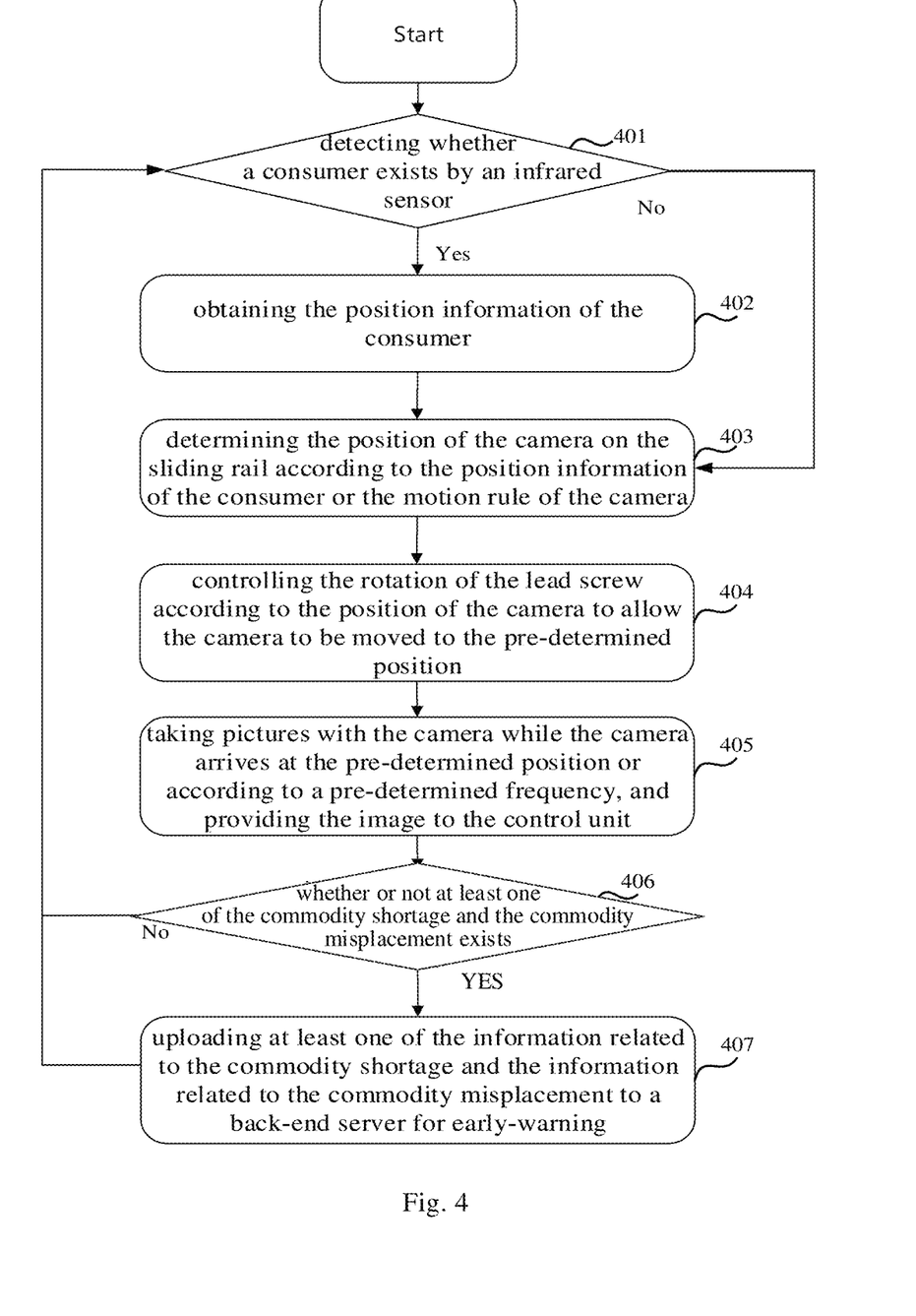
FIG. 4 is a flow chart of an example of a monitoring method for a goods shelf provided by at least an embodiment of the present disclosure.

FIG. 3 is a flow chart of the monitoring method for the goods shelf provided by at least an embodiment of the present disclosure, and the monitoring method for the goods shelf comprises the following step 310-step 330.

Step 310: obtaining the image of the commodities through taking pictures of the commodities using the camera that is slide along the sliding rail.

In some embodiments of the present disclosure, the image of the commodities may be obtained by taking pictures of the commodities according to a pre-determined time gap by the camera, and the camera moves, along the sliding rail that is mounted on the goods shelf, according to a pre-determined speed;

Step 320: determining whether or not at least one of the group consisting of the commodity shortage and the commodity misplacement exists for the goods shelf according to the obtained image of the commodities.

Step 330: sending at least one of the group consisting of information related to the commodity shortage and information related to the commodity misplacement to a back-end server in the case where it is determined that at least one of the group consisting of the commodity shortage and the commodity misplacement exists.

For example, the method may further comprise the following steps: firstly, obtaining the position information of the target object that is in front of the goods shelf based on a detector (for example, a target object detector); and then controlling the driving unit to allow the camera to slide to the pre-determined position(s) corresponding to the position information along the sliding rail according to the position information. In this case, the above-mentioned step 310 (that is, obtaining the image of the commodities through taking pictures of the commodities using the camera that is slide along the sliding rail) may specifically comprises: obtaining the image of the commodities through taking pictures of the commodities using the camera that is slide along the sliding rail while the camera is at the pre-determined position(s).

For example, the camera conducts a reciprocating motion along the sliding rail that is mounted on the goods shelf according to a pre-determined speed and takes pictures of the commodities according to a pre-determined time gap (for example, the time between taking any two adjacent pictures in time is equal to pre-determined time gap) in the case where the detection result of the detector is that the target object is not in front of the goods shelf; the camera moves to the region, that is corresponding to the target object, of the sliding rail (for example, the region, that is directly in front of the target object, of the sliding rail) in the case where the detection result of the detector is that the target object is in front of the goods shelf.

An example of the above-mentioned monitoring method for the goods shelf will be described in the following. As illustrated in FIG. 4, the monitoring method for the goods shelf comprises the following step 401-step 407.

Step 401: detecting whether or not a consumer is in front of the goods shelf by an infrared sensor; sequentially executing step 402 and step 403 if the detection result of the infrared sensor is that the consumer is in front of the goods; and controlling the movement of the camera according to the motion rule that allows the camera to conduct a reciprocating motion on the sliding rail with a uniform speed and directly executing step 403 if the detection result of the infrared sensor is that the consumer is not in front of the goods.

Step 402: obtaining the position information of the consumer.

Step 403: determining the position of the camera on the sliding rail (for example, the position that the camera should be moved to, or a pre-determined position; for another example, the current position of the camera and the position that the camera should be moved to). For example, the position of the camera on the sliding rail is determined according to the position information of the consumer if the detection result of the infrared sensor is that the consumer is in front of the goods; the position of the camera on the sliding rail is determined according to the motion rule (for example, a reciprocating motion with a uniform speed) of the camera if the detection result of the infrared sensor is that the consumer is in not front of the goods.

Step 404: controlling the rotation of the lead screw according to the position of the camera (for example, the position that the camera should be moved to, or the pre-determined position; for another example, the current position of the camera and the position that the camera should be moved to), so as to allow the camera to be able to be moved to the pre-determined position.

Step 405: taking pictures with the camera, and providing (for example, uploading) the image taken by the camera to the control unit. For example, the camera takes the picture while the camera arrives at the pre-determined position if the detection result of the infrared sensor is that the consumer is in front of the goods; the camera takes the picture according to a pre-determined image acquisition frequency or a pre-determined time gap if the detection result of the infrared sensor is that the consumer is in not front of the goods.

Step 406: processing, by the control unit, the image and conducts determination with respect to the image provided by (uploaded by) the camera regarding whether or not at least one of the commodity shortage and the commodity misplacement exists; returning to the step 401 in the case where it is determined that at least one of the commodity shortage and the commodity misplacement does not exist, or executing step 407 in the case where it is determined that at least one of the commodity shortage and the commodity misplacement exist.

Step 407: uploading at least one of the information related to the commodity shortage and the information related to the commodity misplacement to a back-end server for early-warning, and then returning to step 401 to re-execute the above-mentioned steps.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. A monitoring system for a goods shelf, comprising: an image acquisition device and a controller,
   wherein the image acquisition device comprises a camera that is moveable along the goods shelf, and is configured to acquire an image of commodities on the goods shelf by the camera, and to send the image of the commodities to the controller;
   the controller is configured to recognize the image, which is acquired by the camera, of the commodities, so as to determine whether or not at least one of a group consisting of commodity shortage and commodity misplacement exists;
   the image acquisition device further comprises a sliding rail which is mounted on the goods shelf;
   the camera is mounted on the sliding rail and is slidable along the sliding rail;
   the monitoring system for the goods shelf further comprises a target object detector;
   the target object detector is configured to detect whether or not a target object is in front of the goods shelf, and to send a detection result to the controller;
   the controller is further configured to control a movement of the camera based on the detection result sent by the target object detector;
   the controller is further configured to conduct following operations so as to recognize the image, which is sent by the camera, of the commodities:
   dividing the image of the commodities into a plurality of image regions, wherein the plurality of image regions are respectively corresponding to a plurality of commodity regions of the goods shelf;
   determining whether or not each of the image regions comprises an image sub-region corresponding to a misplaced commodity based on the image of the commodities, and determining that the commodity misplacement exists in a case where at least one image region comprises the image sub-region corresponding to the misplaced commodity; and
   obtaining a number of each of the commodities in each of the commodity regions based on the image of the commodities, so as to acquire stock of the each of the commodities, and determining commodity shortage exists in a case where stock of at least one commodity is smaller than a stock reminding threshold of the at least one commodity.

2. The monitoring system for the goods shelf according to claim 1, further comprising a driver,
   wherein the driver is configured to drive the camera to move along the goods shelf under control of the controller.

3. The monitoring system for the goods shelf according to claim 2, wherein the driver is mounted on an end of the sliding rail and is configured to drive the camera to slide along the sliding rail.

4. The monitoring system for the goods shelf according to claim 3, further comprising a power supply unit,
wherein at least part of the power supply unit is mounted on the goods shelf, and the power supply unit is configured to supply electricity to the monitoring system for the goods shelf;
the goods shelf comprises a frame and at least one division plate that is fixed to the frame and is configured to allow the commodities to be placed thereon; and
two ends of the sliding rail are respectively fixed to the frame; or the sliding rail is fixed at a bottom surface of the division plate.

5. The monitoring system for the goods shelf according to claim 1, further comprising a communication device,
wherein the controller allows the communication device to send at least one of a group consisting of information related to the commodity shortage and information related to the commodity misplacement to a back-end server in a case where the controller determines that at least one of the group consisting of the commodity shortage and the commodity misplacement exists.

6. The monitoring system for the goods shelf according to claim 1, wherein the controller is further configured to allow the camera to conduct a reciprocating motion along the goods shelf in a case where the detection result is that the target object is not in front of the goods shelf; and
the controller is further configured to allow the camera to follow a movement of the target object in a case where the detection result is that the target object is in front of the goods shelf.

7. The monitoring system for the goods shelf according to claim 6, wherein the controller is further configured to allow the camera to move along a sliding rail that is mounted on the goods shelf according to a pre-determined speed and acquire images of the commodities on the goods shelf according a pre-determined acquisition speed while conducting the reciprocating motion in a case where the detection result is that the target object is not in front of the goods shelf; and
the controller is further configured to allow a distance between the camera and the target object is within a pre-determined distance range and to allow the camera to acquire the image of the commodities on the goods shelf while the distance between the camera and the target object is within the pre-determined distance range in a case where the detection result is that the target object is in front of the goods shelf.

8. The monitoring system for the goods shelf according to claim 1, wherein the controller is further configured to determine a main target object and to allow the camera to follow a movement of the main target object in a case where the detection result of the target object detector is that at least two target objects are in front of the goods shelf.

9. The monitoring system for the goods shelf according to claim 1, wherein the monitoring system for the goods shelf comprises a plurality of target object detectors; and
the plurality of target object detectors is arranged in parallel along a length direction of the goods shelf.

10. The monitoring system for the goods shelf according claim 1, wherein the goods shelf comprises a frame and at least one division plate that is fixed to the frame and is configured to allow the commodities to be placed thereon, and a side surface of each of the at least one division plate is provided with a baffle;
the target object detector comprises at least one of a group consisting of an infrared sensor, an ultrasound sensor, a laser sensor, a weight sensor, or a gravity sensor; and
at least one of a group consisting of the infrared sensor, the ultrasound sensor and the laser sensor is provided at a side, which is away from the each of the at least one division plate, of the baffle; or
at least one of a group consisting of the gravity sensor and the weight sensor is provided at a region, which is in front of the goods shelf, of ground.

11. The monitoring system for the goods shelf according to claim 1, wherein the image acquisition device is configured to acquire at least two images of the commodities on the goods shelf through the camera, and to send the at least two images of the commodities to the controller; and
the controller is further configured to recognize the at least two images of the commodities so as to determine whether or not at least one of the group consisting of the commodity shortage and the commodity misplacement exists.

12. A monitoring method for a goods shelf implemented by the monitoring system for the goods shelf according to claim 1, comprising:
obtaining the image, acquired by the camera which is moveable along the goods shelf, of the commodities on the goods shelf; and
recognizing the image of the commodities sent by the camera, so as to determine whether or not at least one of the group consisting of the commodity shortage and the commodity misplacement exists.

13. The monitoring method for the goods shelf according to claim 12, wherein obtaining of the image, acquired by the camera which is moveable along the goods shelf, of the commodities on the goods shelf comprises: obtaining the image, acquired by the camera which is slide along a sliding rail mounted on the goods shelf, of the commodities on the goods;
the monitoring method for the goods shelf further comprises:
sending at least one of a group consisting of information related to the commodity shortage and information related to the commodity misplacement to a back-end server in a case where it is determined that at least one of the group consisting of the commodity shortage and the commodity misplacement exists for the goods shelf.

14. The monitoring method for the goods shelf according to claim 13, further comprising:
obtaining position information of a target object in front of the goods shelf based on a target object detector;
controlling a driver based on the position information, so as to allow the camera to slide along the sliding rail to a pre-determined position corresponding to the position information,
wherein obtaining of the image, acquired by the camera which is slide along the sliding rail mounted on the goods shelf, of the commodities on the goods comprises: acquiring the image through allowing the camera, which is slide along the sliding rail mounted on the goods shelf, to take a picture of the commodities while camera is at the pre-determined position.

15. The monitoring method for the goods shelf according to claim 13, wherein the image of the commodities on the goods shelf are obtained by taking pictures of the commodities according to a pre-determined time gap by the camera while the camera conducts a reciprocating motion, along the sliding rail that is mounted on the goods shelf, according to a pre-determined speed;

obtaining of the image, acquired by the camera which is moveable along the goods shelf, of the commodities on the goods shelf comprises: obtaining at least two images, acquired by the camera which is moveable along the goods shelf, of the commodities on the goods shelf.

16. A monitoring system for a goods shelf, comprising: an image acquisition device and an information receiving and transmitting device,
  wherein the image acquisition device comprises a camera that is moveable along the goods shelf, and is configured to acquire an image of commodities on the goods shelf by the camera; and
  the information receiving and transmitting device is configured to send the image of the commodities to a server, and to receive a recognition result, that is obtained based on the image of the commodities and is used to determine whether or not at least one of a group consisting of commodity shortage and commodity misplacement exists, from the server;
  the image acquisition device further comprises a sliding rail which is mounted on the goods shelf;
  the camera is mounted on the sliding rail and is slidable along the sliding rail;
  the monitoring system for the goods shelf further comprises a target object detector;
  the target object detector is configured to detect whether or not a target object is in front of the goods shelf, and to provide a detection result to the server via the information receiving and transmitting device; and
  a movement of the camera is controlled based on the detection result provided by the target object detector.

17. A monitoring system for a goods shelf, comprising an information receiving and transmitting device and a processor device,
  wherein the information receiving and transmitting device is configured to receive an image, which is provided by a camera that is moveable along the goods shelf, of commodities on the goods shelf;
  the processor device is configured to recognize the image, so as to obtain a recognition result; and
  the information receiving and transmitting device is configured to send the recognition result, that is obtained based on the image by the processor device and is used to determine whether or not at least one of a group consisting of commodity shortage and commodity misplacement exist, to a client;
  following operations are conducted as to recognize the image, which is provided by the camera that is moveable along the goods shelf, of the commodities:
  dividing the image of the commodities into a plurality of image regions, wherein the plurality of image regions is respectively corresponding to a plurality of commodity regions of the goods shelf;
  determining whether or not each of the image regions comprises an image sub-region corresponding to a misplaced commodity based on the image of the commodities, and determining that the commodity misplacement exists in a case where at least one image region comprises the image sub-region corresponding to the misplaced commodity; and
  obtaining a number of each of the commodities in each of the commodity regions based on the image of the commodities, so as to acquire stock of the each of the commodities, and determining commodity shortage exists in a case where stock of at least one commodity is smaller than a stock reminding threshold of the at least one commodity.

\* \* \* \* \*